(12) United States Patent
Satoh et al.

(10) Patent No.: US 8,574,503 B2
(45) Date of Patent: Nov. 5, 2013

(54) INSTRUMENT FOR NONDESTRUCTIVELY PRODUCING HIGH-CONCENTRATION HYDROGEN SOLUTION

(71) Applicant: MIZ Co., Ltd., Kanagawa (JP)

(72) Inventors: Fumitake Satoh, Kanagawa (JP); Tomoki Seo, Kanagawa (JP); Ryosuke Kurokawa, Kanagawa (JP); Bunpei Satoh, Kanagawa (JP)

(73) Assignee: MIZ Co., Ltd., Kanagawa (JP)

( * ) Notice: Subject to any disclaimer, the term of this patent is extended or adjusted under 35 U.S.C. 154(b) by 0 days.

(21) Appl. No.: 13/715,617

(22) Filed: Dec. 14, 2012

(65) Prior Publication Data

US 2013/0108515 A1    May 2, 2013

Related U.S. Application Data

(63) Continuation of application No. PCT/JP2011/063601, filed on Jun. 14, 2011.

(30) Foreign Application Priority Data

Jun. 14, 2010 (JP) ................... 2010-135513
Nov. 1, 2010 (JP) ................... 2010-245269
May 20, 2011 (JP) ................... 2011-113779

(51) Int. Cl.
*C01B 6/00* (2006.01)
*A47G 19/14* (2006.01)
*A23L 2/00* (2006.01)

(52) U.S. Cl.
USPC ............................... 422/162; 99/323; 426/67

(58) Field of Classification Search
USPC ................. 422/162; 99/323; 426/67
See application file for complete search history.

(56) References Cited

U.S. PATENT DOCUMENTS

| | | | | |
|---|---|---|---|---|
| 4,514,510 A | * | 4/1985 | Alexander | 501/148 |
| 4,787,973 A | * | 11/1988 | Ando et al. | 210/282 |
| 4,906,103 A | * | 3/1990 | Kao | 366/130 |
| 5,215,659 A | * | 6/1993 | Ando | 210/282 |
| 5,846,522 A | * | 12/1998 | Kosti | 424/52 |
| 2002/0193453 A1 | * | 12/2002 | Bohling et al. | 521/26 |
| 2005/0121399 A1 | * | 6/2005 | Hayashi et al. | 210/749 |
| 2007/0128104 A1 | | 6/2007 | Hayashi et al. | |
| 2010/0068343 A1 | * | 3/2010 | Johann et al. | 426/66 |
| 2010/0272789 A1 | * | 10/2010 | Satoh et al. | 424/450 |
| 2011/0198236 A1 | * | 8/2011 | Sumita et al. | 205/746 |

FOREIGN PATENT DOCUMENTS

| | | | |
|---|---|---|---|
| EP | 1867607 A1 * | 12/2007 | C02F 1/46 |
| JP | 2003-20202 A | 1/2003 | |
| JP | 2003-119500 A | 4/2003 | |
| JP | 2007-167696 A | 7/2007 | |
| JP | 2009-126736 A | 6/2009 | |
| JP | 4769903 B | 6/2011 | |
| TW | 200631906 | 9/2006 | |
| WO | WO 2006/098003 | 9/2006 | |
| WO | WO 2009084743 A1 * | 7/2009 | A61K 33/00 |

* cited by examiner

*Primary Examiner* — Walter D Griffin
*Assistant Examiner* — Huy-Tram Nguyen
(74) *Attorney, Agent, or Firm* — Muncy, Geissler, Olds & Lowe, PLLC

(57) ABSTRACT

An instrument for producing hydrogen-dissolved liquid comprises a hydrogen generating system stored in a separator, and the hydrogen generating system comprises: a hydrogen generating agent that reacts with raw water to generate hydrogen; a metal-ion sequestering agent that sequesters metal ions dissolved from the hydrogen generating agent; and a pH adjusting agent.

2 Claims, 1 Drawing Sheet

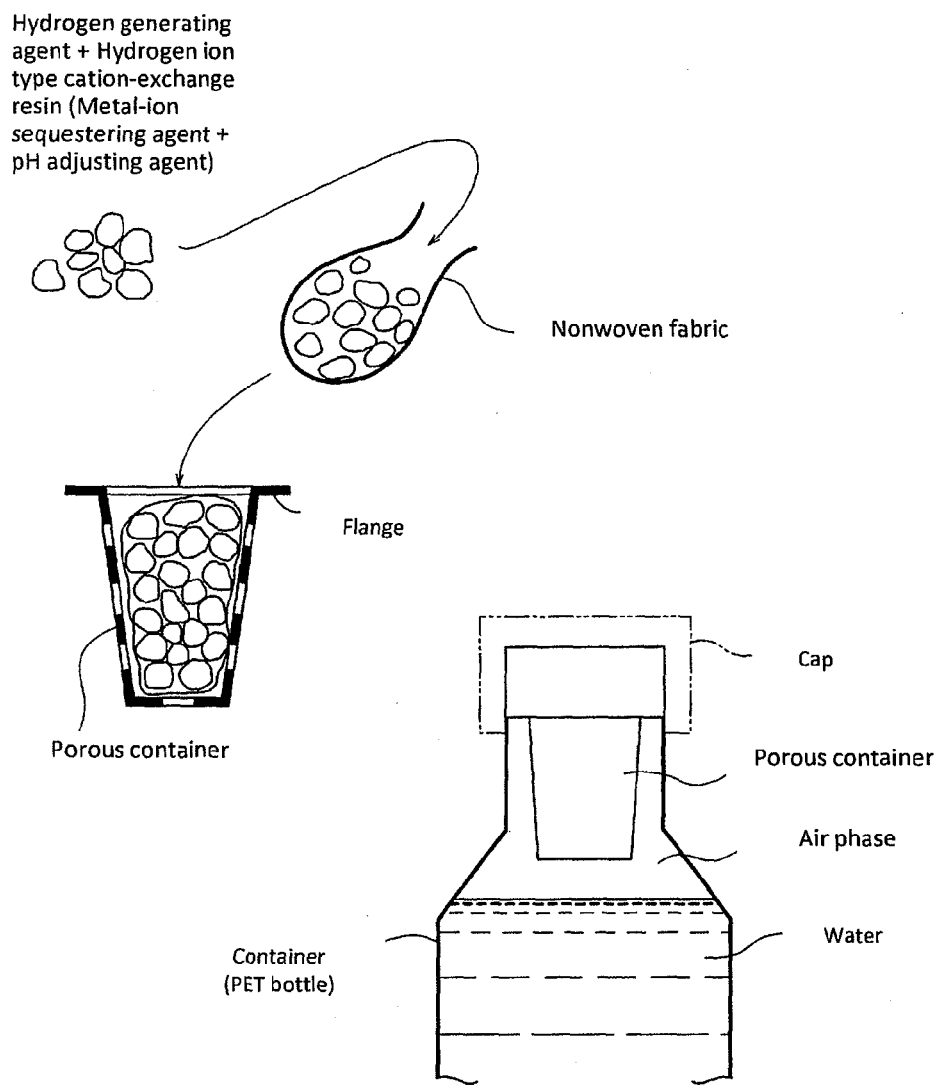

INSTRUMENT FOR NONDESTRUCTIVELY PRODUCING HIGH-CONCENTRATION HYDROGEN SOLUTION

BACKGROUND OF THE INVENTION

1. Technical Field

The present invention relates to an instrument for nondestructively producing high-concentration hydrogen solution.

2. Description of the Related Art

Known methods of producing hydrogen water include a method that uses a hydrogen water electrolytically generating apparatus for household use and a method that causes metal pieces of metal magnesium as a hydrogen generating agent to contact with water (Japanese Patent Application Publication No. 2007-167696).

SUMMARY OF THE INVENTION

When trying to obtain hydrogen solution using a hydrogen generating agent, the hydrogen generating agent may even change properties of raw water (or raw liquid, here and hereinafter) during the dissolution of hydrogen molecules into the raw water. If, for example, the hydrogen generating agent is metal magnesium, then magnesium ions are dissolved into the raw water to shift the pH toward alkaline side in accordance with the following Formulae (1) and (2) when generating hydrogen.

Formula (1)

Formula (2)

However, it is not desirable in general to change, before and after the hydrogen generating reaction, constituents of the raw water having already been naturally or artificially composed. The change in constituents may in turn lead to altering the flavor of beverages, such as tea and mineral water.

Of course, if the hydrogen-dissolved liquid is used at the instant when the hydrogen generating reaction has less progressed, then the dissolution of magnesium and the alkalization of liquid may be minimized. In this case, however, the hydrogen-dissolved liquid may have to be accepted as being of lower dissolved-hydrogen concentration.

Therefore, an instrument for producing hydrogen-dissolved liquid is desired which is unlikely to change constituents of raw water (i.e. which is nondestructive) while facilitating the hydrogen generating reaction.

The present invention utilizes an instrument for nondestructively producing high-concentration hydrogen solution, wherein the instrument comprises a hydrogen generating system stored in a separator, and the hydrogen generating system comprises: a hydrogen generating agent such as metal magnesium; a metal-ion sequestering agent for sequestering metal ions originated from the hydrogen generating agent; and a pH adjusting agent.

By facilitating the hydrogen generating reaction in raw water using such an instrument, high-concentration or supersaturated hydrogen solution can be obtained in which magnesium ions (or by-products such as cations dissolved from the hydrogen generating agent during the hydrogen generation) are not to increase and the pH of the raw water is not caused to change. Using such an instrument allows high-concentration hydrogen beverages to be easily produced without altering the flavor of any beverage regardless of locations, such as home, workplace, street, and storefront.

BRIEF DESCRIPTION OF THE DRAWINGS

FIG. 1 is a view illustrating an instrument for production according to one embodiment of the present invention.

DESCRIPTION OF THE PREFERRED EMBODIMENTS

Hereinafter, embodiments of the present invention will be described.

The raw water in the present invention is a liquid, such as water or water solution, which generates hydrogen by contact with a hydrogen generating agent, and examples thereof include a liquid as an objective to be dissolved therein with hydrogen using the present invention, such as water or water solution. Therefore, examples of the raw water include thinkable water as well as beverages such as tea and coffee. Hydrogen solution obtained by contacting the raw water and the hydrogen generating agent may be applied to living organisms via inhalation (atomization), drinking, injection or other appropriate means, but is not limited thereto. The active constituent of the hydrogen solution is hydrogen, and the functionality thereof is primarily, but not limited to, inhibition of oxidative stress.

The hydrogen generating agent in the present invention is a substance which generates hydrogen by contact with the raw water. Examples of the hydrogen generating agent include substances that generate hydrogen by contact with water, such as metals having higher ionization tendency than hydrogen and hydrogenated compounds including metal hydride. In consideration of high reactivity with water, it is preferred to use metal calcium, calcium hydride, metal magnesium, magnesium hydride or other similar substances. With consideration for safety of the reaction product and other factors, it is particularly preferred to use metal magnesium, metal iron, metal aluminum, metal zinc, metal nickel, metal cobalt or other similar substances.

The metal-ion sequestering agent in the present invention is generally an agent that adjusts increase and decrease of metal ions in the hydrogen solution in association with the hydrogen generating reaction, and examples thereof include insoluble or poorly soluble substances that are absolutely undissolved or scarcely dissolved in water and have properties of adsorbing metal ions in the internal of a separator, and substances that are dissolved in water thereby to capture metal ions and generate substances safe for living organisms. In view of not changing constituents of the raw water, insoluble or poorly soluble metal-ion sequestering agents are preferred, such as a cation-exchange resin. Among them, further preferred is a hydrogen ion type cation-exchange resin that includes a substance which releases hydrogen ions ($H^+$) while adsorbing metal ions, such as an acidic cation-exchange resin having sulfonic acid group as an exchange group or an acidic cation-exchange resin having carboxylic acid group as an exchange group, because the hydrogen ion type cation-exchange resin also has a functionality as a pH adjusting agent.

The pH adjusting agent in the present invention is generally a substance that adjusts variation in pH of the hydrogen solution in association with the hydrogen generating reaction, and examples thereof include a substance that has a property for inhibiting (neutralizing or preventing the generation of) hydroxide ions ($OH^-$) by supplying hydrogen ions ($H^+$), such as citric acid, adipic acid, malic acid, acetic acid, succinic acid, gluconic acid, lactic acid, phosphoric acid, hydrochloric acid, sulfuric acid and other acids, and also include a substance that is hydrolyzed to generate hydroxide. In view of being unlikely to change constituents of the raw water, preferred is a compound, such as a mineral ore including aluminum ions, which is hydrolyzed to generate metal hydroxide. For example, alums such as aluminum ammonium sulfate and aluminum potassium sulfate are more preferred because they are hydrolyzed to generate aluminum hydroxide while the generated poorly soluble hydroxide (aluminum hydroxide) also acts as a metal-ion sequestering agent that sequesters metal ions by behaving as an aggregating agent for magnesium ions and calcium ions and is rapidly solidified after the hydrogen generating reaction to sequester further dissolution of metal ions.

In addition, when the hydrogen generating agent is an amphoteric metal, such as zinc and aluminum, which also reacts with a base, examples of the pH adjusting agent to be preferably used include substances that are dissolved in water to be alkalified, such as basic oxide of metal (such as alkali silicate), hydroxide of metal, and calcined mineral (such as calcined zeolite), (including oxide (or hydroxide) of alkaline-earth metal, e.g. magnesium oxide (hydroxide), strontium oxide (hydroxide) and barium oxide (hydroxide)). For example, more preferred is a compound, such as magnesium oxide (hydroxide), which is hydrolyzed to generate metal hydroxide because the compound also acts as a metal-ion sequestering agent that is rapidly solidified after the hydrogen generating reaction to sequester further dissolution of metal ions.

As described above, hydrogen ion type cation-exchange resin, alum or magnesium oxide (hydroxide) has both the function as a metal-ion sequestering agent and the function as a pH adjusting agent even if provided as one agent. This is thus preferred because less number of agents to be stored in a separator allows for removing concerns about the dissolution of excessive components.

In addition, it is preferred that, in order to suppress time degradation of the hydrogen generating agent, the hydration number and the water content ratio of the substances, such as the metal-ion sequestering agent and the pH adjusting agent, contained in the hydrogen generating system are lower. More specifically, with respect to the hydration number, it is desirable to be trihydrate or lower, preferably dihydrate or lower, more preferably monohydrate or lower, and most preferably nonhydrate or anhydride. It is also desirable that the water content ratio is 40 weight % or less, preferably 30 weight % or less, more preferably 20 weight % or less, and most preferably 15 weight % or less.

The separator in the present invention is a container that stores the hydrogen generating system including the hydrogen generating agent, the metal-ion sequestering agent and the pH adjusting agent. The separator is characterized by being configured such that the raw water passes therethrough while the separator is unlikely to be passed therethrough with substances contained in the hydrogen generating system and residual substances caused from the hydrogen generation. It is preferred that the pore size of the separator is 1,000 μm or less, preferably 500 μm or less, more preferably 150 μm or less, and most preferably 50 μm or less. Examples of the separator include a bag-like container formed of nonwoven fabric, a plastic porous container, other appropriate containers and a combination thereof. In order to ensure the separating effect, the hydrogen generating system is preferred to be separated such as by a bag-like container formed of nonwoven fabric and further separated in a nested form such as by combination with a hard and porous container.

It is also preferred that the average grain diameter of the hydrogen generating agent such as metal magnesium in the present invention is a grain diameter which is enough not to pass those grains through the container to the outside and enables to enhance the activity thereof by microparticulation. More specifically, the average grain diameter of the hydrogen generating agent is preferred to be the pore size of the separator or more (for the separator comprised of nested components, the pore size of a component having minimum pore size or more, here and hereinafter) and 3,000 μm or less, preferably the pore size of the separator or more and 1,000 μm or less, more preferably the pore size of the separator or more and 500 μm or less, and most preferably the pore size of the separator or more and 250 μm or less.

High concentration hydrogen solution in the present invention includes hydrogen solution of which the dissolved-hydrogen concentration in the solution is 0.1 ppm or more, and preferably 1.0 ppm or more. Supersaturated hydrogen solution in the present invention involves a situation where the dissolved-hydrogen concentration is higher than or equal to the solubility at normal temperature and pressure, and includes high concentration hydrogen solution of 1.6 ppm or more, 2.0 ppm or more, 3.0 ppm or more, 4.0 ppm or more, 5.0 ppm or more, 6.0 ppm or more, 7.0 ppm or more, 8.0 ppm or more, 9.0 ppm or more, and 10.0 ppm or more.

Note that it is preferred, for the purpose of increasing the dissolved-hydrogen concentration in the hydrogen solution, to store in a closed container the instrument for nondestructively producing high-concentration hydrogen solution according to the present invention, which is configured by storing the hydrogen generating system in the separator, and to appropriately shake the closed container. The instrument for production according to the present example is shown in FIG. 1.

In this case, the closed container in the present invention is intended to include a container which is configured not to expose the contents in the container to the air. Examples of the closed container include containers with lids, such as PET bottles and aluminum bottles with caps. It is preferred that the closed container has a portable form and volume in order for a person to easily shake it in his/her hand. It is also preferred that the closed container is of 2 L or less, preferably 1 L or less, and most preferably 0.5 L or less, but not limited thereto.

Preferred materials for the closed container are to have low hydrogen permeability. As the hydrogen permeability is lower, the generated hydrogen is unlikely to escape from the container system.

The hydrogen permeability of the closed container in the present invention is measured as follows. That is, with reference to a method such as described in Patent Application No. 2009-221567, hydrogen-dissolved water is prepared to stably keep approximately the saturated concentration (1.6 ppm at 20 degrees C. and 1 atm) with the volume of 20 times the inner volume of a closed container as an object to be measured, and the closed container is then immersed during 5 hours in the hydrogen-dissolved water after being fully filled with clarified water (such as charcoal-treated water obtained by treating Fujisawa city tap water to pass through a charcoal column).

Thereafter, the dissolved-hydrogen concentration in the clarified water is measured, wherein the container of lower hydrogen permeability in the present invention involves a closed container with dissolved-hydrogen concentration of 1,000 ppb or lower, preferably 500 ppb or lower, more preferably 100 ppb or lower, and most preferably 10 ppb or lower.

It is preferred that the closed container has a pressure-proof property capable of resisting the increase in the inner pressure due to the generation of hydrogen. Specifically, it is preferred to be a pressure-proof container capable of resisting the inner pressure of 0.11 MPa as absolute pressure, preferably 0.4

MPa, more preferably 0.5 MPa, and most preferably 0.8 MPa. A PET bottle for carbonated drink may be preferably used. It is also preferred that the closed container comprises at the mouth thereof a mechanism (vent slot) for releasing the pressure in the course of opening the cap so that safety opening can be performed.

Shaking in the present invention is to give a physical impact or shock to the closed container thereby causing the solution and the gas-phase hydrogen to contact with each other in the closed container. The shaking in the present invention involves natural shaking using hand or hands as well as artificial shaking using a machine. Examples of such artificial shaking include shaking by using a shaking machine, an agitator, an ultrasonic generator, and other apparatuses.

Note that an exemplary case of the natural shaking in the present invention is as follows. That is, the shaking is performed by a Japanese man of 30's having an average physical size who holds the middle portion of the closed container by his dominant hand and moves only the wrist to shake it so that the cap forms into an arch above the wrist with a pace of 2 strokes per second, total 120 strokes.

In consideration of the burden to consumers and convenience, it is desirable that the amount of time for shaking is 600 seconds or less, preferably 60 seconds or less, more preferably 30 seconds or less, and further preferably 10 seconds or less.

In addition, considering the facility in shaking, it is desirable that the closed container is provided therein with a head space of 15% or less with respect to the container volume, preferably 10% or less, and most preferably 5% or less even after being filled with the raw water.

The dissolved-hydrogen concentration in the solution after the shaking is preferred to be enhanced 1.1 times or higher than the dissolved-hydrogen concentration before the shaking, preferably twice or higher, more preferably 3 times or higher, further preferably 4 times or higher, 5 times or higher, 6 times or higher, 7 times or higher, 8 times or higher and 9 times or higher in this order, and most preferably 10 times or higher.

It is also preferred that the inner pressure in the closed container before the shaking is equal to or higher than the atmosphere pressure in order to obtain higher concentration hydrogen solution, such as supersaturated hydrogen solution with 1.6 ppm or higher. The solubility of hydrogen molecules to the hydrogen solution increases as the inner pressure loaded by the generated hydrogen molecules to the closed container increases, and exceeds the solubility at normal temperature and pressure in due time. The reason why the closed container storing the hydrogen generating system is left during an appropriate amount of time, such as 10 minutes or 15 hours, such as in the examples as will be described later, is to pressurize the closed container from the inside by the generated hydrogen gas, and also to allow for appropriately shaking the closed container under the increased pressure thereby further accelerating the dissolution of the hydrogen molecules to the hydrogen solution.

Meanwhile, a substance having metal ion sequestering ability and pH adjusting ability, such as the above-described hydrogen ion type cation-exchange resin, may be combined with a hydrogen generating agent including metal having higher ionization tendency than hydrogen, such as metal magnesium, or hydrogenated metal, thereby to constitute an effective hydrogen generating system in which three functionalities of hydrogen generating, metal ion sequestering and pH adjusting are closely associated with one another. As an example, the hydrogen generating system configured of metal magnesium and hydrogen ion type cation-exchange resin will be described below.

In general, if metal magnesium is contacted with raw water, hydrogen molecule and magnesium hydroxide are generated in accordance with the above-described Formula (1). As the reaction mechanism thereof, the following elementary reactions are considered:

$$Mg \rightarrow Mg^{2+} + 2e^- \qquad \text{Formula (3)}$$

wherein electrons are released from metal magnesium;

$$2H_2O + 2e^- \rightarrow 2OH^- + H_2 \qquad \text{Formula (4)}$$

wherein the electrons derived from the metal magnesium reduce water molecules to thereby generate hydrogen molecule and hydroxide ions; and $$2H^+ + 2e^- \rightarrow H_2 \qquad \text{Formula (5)}$$

wherein the electrons derived from the metal magnesium reduce hydrogen ions to thereby generate hydrogen molecule.

Here, if hydrogen ion type cation-exchange resin is present in the vicinity of metal magnesium, then the magnesium ion released in accordance with Formula (3) is adsorbed to the hydrogen ion type cation-exchange resin and hydrogen ions are released from the hydrogen ion type cation-exchange resin. Therefore, electrons released in accordance with Formula (3) preferentially reduce such adjacent hydrogen ions rather than reduce water molecules.

Thus, in the hydrogen generating system of the present invention, hydrogen is preferentially generated in accordance with Formula (5) which is a hydrogen generating reaction not to generate hydroxide ions rather than in accordance with Formula (4) which is a hydrogen generating reaction to generate hydroxide ions, and the pH of the raw water is thereby unlikely to be changed. In addition, the hydrogen generating reaction as the forward reaction in Formula (1) may be readily accelerated because magnesium ions and hydroxide ions tend to be maintained as being constantly decreased in the system.

It is to be noted herein that the hydrogen generating agent, the metal-ion sequestering agent and the pH adjusting agent are stored in a separator such as nonwoven fabric and/or porous container as shown in FIG. 1, and they are designed such that those agents in themselves and residual substances after the reaction are not to transfer into the raw water. However, the raw water permeates the separator to contact the contents in the separator. Therefore, if some hardness components such as magnesium ions are included in the raw water, then the metal-ion sequestering agent in the separator is expected to capture not only metal ions derived from the hydrogen generating agent but also such metal ions derived from the raw water.

Contrary to the expectation, however, the metal-ion sequestering ability in the separator scarcely captures the hardness components originally included in the raw water. In other words, the instrument for nondestructively producing high-concentration hydrogen solution according to the present invention using a substance in the hydrogen generating system, such as hydrogen ion type ion-exchange resin, which has both the metal-ion sequestering ability and the pH adjusting ability, may be said as not increasing metal ions derived from the hydrogen generating agent, such as magnesium dissolved in the raw water, as well as not decreasing them.

Although the present inventors have not fully revealed the reason for the above, it appears that metal ions derived from the hydrogen generating agent are preferentially captured with considerable extent compared to metal ions coming from the external of the separator because the hydrogen generating agent and the metal-ion sequestering agent in such a hydrogen generating system are densely contacted with each other (mixed) in a relatively narrow space in the separator.

Note that the condition of maintaining or not changing the hardness components in the raw water is represented, such as, but not limited to, by the following cases.

That is, such cases include cases where: a PET bottle for carbonated drink (about 530 cc volume when filled with full water to the mouth) is substantially filled with about 515 cc of the raw water as being clarified water obtained by dechlorination treating of tap water and having total hardness (Ca hardness+Mg hardness) of about 55 to 65 ppm (such as clarified water obtained by treating Fujisawa city tap water to pass through a charcoal column); the instrument for nondestructively producing high-concentration hydrogen solution according to the present invention is kept in the mouth air phase of the bottle so as not to sink into the water thereafter closed with a cap (refer to Example 1 as will be described later); the bottle is left to be laid flat during 10 minutes; typical and natural shaking (holding the middle portion of the PET bottle by one's dominant hand and moving only the wrist so that the cap forms into an arch above the wrist with a pace of 2 strokes per second, total 120 strokes) is performed; and the resulting total hardness of the solution is within a range of (the total hardness of the raw water minus 25 ppm) to (the total hardness of the raw water plus 25 ppm), preferably (the total hardness of the raw water minus 15 ppm) to (the total hardness of the raw water plus 15 ppm), and most preferably (the total hardness of the raw water minus 10 ppm) to (the total hardness of the raw water plus 10 ppm).

Note also that the condition of maintaining or not changing the pH of the raw water is represented, such as, but not limited to, by the following cases.

That is, such cases include cases where: a PET bottle for carbonated drink (about 530 cc volume when filled with full water to the mouth) is substantially filled with about 515 cc of the raw water as being clarified water obtained by dechlorination treating of tap water and having pH of about 7.0 to 7.8 (such as clarified water obtained by treating Fujisawa city tap water to pass through a charcoal column); the instrument for nondestructively producing high-concentration hydrogen solution according to the present invention is kept in the mouth air phase of the bottle so as not to sink into the water thereafter closed with a cap (refer to Example 1 as will be described later); the bottle is left to be laid flat during 10 minutes; typical and natural shaking (holding the middle portion of the PET bottle by one's dominant hand and moving only the wrist such that the cap forms into an arch above the wrist with a pace of 2 strokes per second, total 120 strokes) is performed; and the resulting pH of the solution is within a range of (the pH of the raw water minus 1.5) to (the pH of the raw water plus 1.5), preferably (the pH of the raw water minus 1.0) to (the pH of the raw water plus 1.0), and most preferably (the pH of the raw water minus 0.5) to (the pH of the raw water plus 0.5).

EXAMPLES

Examples of the present invention will hereinafter be described. Unless otherwise stated herein, various gauges used for measuring various physicality values are as follows: pH meter (including temperature indicator) manufactured by Horiba, Ltd. (main body type: D-13, probe type: 9620-10D); and DH meter (dissolved-hydrogen meter) manufactured by DKK-Toa Corporation (main body type: DHDI-1, electrode (probe) type: HE-5321, transponder type: DHM-F2).

Calcium hardness and magnesium hardness were measured by the calmagite colorimetric method using a water quality analyzer DR/4000 (manufactured by HACH Company).

Examples 1 to 8, Comparative Examples 1 to 3, and Reference Examples 1 and 2

Granular hydrogen ion type cation-exchange resin (grain diameter: about 425 μm to about 1,180 μm) was obtained by thermally drying a commercially available strongly acidic ion-exchange resin H-type product (DIAION Ion Exchange Resin SK1BH: Mitsubishi Chemical Corporation). The obtained hydrogen ion type cation-exchange resin of 30 mg and metal magnesium powder (MG100: Kanto Metal Corporation) of 300 mg were mixed to be uniformly dispersed, and the obtained mixture as the hydrogen generating system was enclosed in a woven fabric (Precise Regular C5160: Asahi Kasei Corporation) which was then heat sealed before being stored in a tubular porous container (bottom: circle with diameter of about 14 mm, height: about 58 mm), as shown in FIG. 1. A PET bottle for carbonated drink (about 530 cc volume when filled with full water to the mouth) was substantially filled with about 515 cc of clarified water (charcoal-treated water obtained by treating Fujisawa city tap water to pass through a charcoal column), thereafter the porous container was inserted into the PET bottle mouth while the flange provided around the top of the porous container was engaged with the mouth of the bottle so that the porous container would not sink into the water, and the bottle was closed with a cap. The weight ratio of the metal magnesium and the hydrogen ion type cation-exchange resin included in the obtained hydrogen generating agent was 1:0.1.

Thereafter, the bottle was left to be laid flat during 10 minutes so that the porous container fully contacted with the raw water, and one of the present inventors (Japanese man of 30's having an average physical size) then held the middle portion of the PET bottle by his dominant hand and moved only the wrist to shake it so that the cap was forming into an arch above the wrist with a pace of 2 strokes per second, total 120 strokes (total 60 seconds).

After that, measurements were done for pH, dissolved-hydrogen concentration, calcium (Ca) hardness and magnesium (Mg) hardness of the contained liquid.

In addition, a plurality of mixtures with various contained amounts of hydrogen ion type cation-exchange resins (Examples 2 to 8 and Comparative Example 1) were produced and treated in the same procedure as Example 1, and measurements were thereafter done for pH, dissolved-hydrogen concentration, calcium (Ca) hardness and magnesium (Mg) hardness of the contained liquid.

Further, as comparative examples, a plurality of mixtures each contained therein with malic acid (DL-malic acid: FUSO CHEMICAL CO., LTD.) substitute for the hydrogen ion type cation-exchange resin (Comparative Examples 2 and 3) were produced and treated in the same procedure as Example 1, and measurements were thereafter done for pH, dissolved-hydrogen concentration, calcium (Ca) hardness and magnesium (Mg) hardness of the contained liquid.

In addition, as Reference Example 1, the clarified water was subjected to measurements for pH, dissolved-hydrogen concentration, calcium (Ca) hardness and magnesium (Mg) hardness.

Further, as Reference Example 2, the hydrogen generating system described as Example 7 was directly put into a PET bottle for carbonated drink (about 530 cc volume when filled with full water to the mouth) substantially filled with about 515 cc of clarified water without being separated by non-woven fabric and porous container, and the bottle was left to be laid flat during 10 minutes, thereafter the contained liquid shaken by the method described for Example 1 was subjected to measurements for pH, dissolved-hydrogen concentration, calcium (Ca) hardness and magnesium (Mg) hardness.

Results are shown in Table 1 below.

thermally drying a commercially available strongly acidic ion-exchange resin H-type product (DIAION Ion Exchange Resin SK1BH: Mitsubishi Chemical Corporation). The obtained hydrogen ion type cation-exchange resin of 300 mg and metal magnesium powder (MG100: Kanto Metal Corporation) of 300 mg were mixed to be uniformly dispersed, and the obtained mixture as the hydrogen generating system was enclosed in a woven fabric (Precise Regular C5160: Asahi Kasei Corporation) which was then heat sealed before being

TABLE 1

|  | Mg (mg) | SK1BH or Malic acid (mg) | Mg:SK1BH or Malic acid | pH | Ca hardness (ppm) | Mg hardness (ppm) | Total hardness (Ca + Mg) | DH (ppm) |
|---|---|---|---|---|---|---|---|---|
| Reference Example 1 |  |  |  | 7.25 | 36.0 | 19.5 | 55.5 | — |
| Reference Example 2 | 300 | 2100 | 1:7 | 10.35 | 38.0 | 88.0 | 126.0 | 1.11 |
| Comparative Example 1 | 300 |  |  | 7.28 | 36.0 | 19.0 | 55.0 | 0.09 |
| Comparative Example 2 | 300 | 300 | 1:1 | 7.13 | 38.0 | 100.0 | 138.0 | 1.16 |
| Comparative Example 3 | 300 | 900 | 1:3 | 4.84 | 40.0 | 282.0 | 322.0 | 2.00 |
| Example 1 | 300 | 30 | 1:0.1 | 7.26 | 35.5 | 18.5 | 54.0 | 0.15 |
| Example 2 | 300 | 100 | 1:0.33 | 7.32 | 36.0 | 20.0 | 56.0 | 0.38 |
| Example 3 | 300 | 200 | 1:0.66 | 7.35 | 35.5 | 18.5 | 54.0 | 0.72 |
| Example 4 | 300 | 300 | 1:1 | 7.29 | 35.0 | 18.0 | 53.0 | 0.90 |
| Example 5 | 300 | 900 | 1:3 | 7.32 | 34.0 | 19.5 | 53.5 | 2.10 |
| Example 6 | 300 | 1500 | 1:5 | 7.32 | 35.0 | 18.5 | 53.5 | 2.90 |
| Example 7 | 300 | 2100 | 1:7 | 7.33 | 36.5 | 20.0 | 56.5 | 3.00 |
| Example 8 | 300 | 9000 | 1:30 | 6.61 | 30.5 | 17.5 | 48.0 | 3.00 |

SK1BH = Strongly acidic ion-exchange resin H-type product

In the instrument for nondestructively producing high-concentration hydrogen solution according to the present invention, when the weight of metal magnesium is constant and the hydrogen ion type cation-exchange resin is contained to have a weight ratio within 0.1 to 0.7 to the metal magnesium, the dissolved-hydrogen concentration in the raw water increases in proportion to the contained amount of the hydrogen ion type cation-exchange resin. In this case, the hardness (Ca hardness and Mg hardness) and the pH of the raw water remain unchanged.

Although the dissolved-hydrogen concentration does not further increase when the hydrogen ion type cation-exchange resin is contained even with the weight ratio of 30, the hardness (Ca hardness and Mg hardness) and the pH of the raw water remain substantially unchanged. In other words, some kind of buffering action works for maintaining the pH and the hardness of the raw water within certain ranges in the hydrogen solution using the instrument for nondestructively producing high-concentration hydrogen solution according to the present invention.

On the other hand, in Reference Example 2 in which metal magnesium and hydrogen ion type cation-exchange resin are contained with the weight ratio of 1:7 but they are directly put into the closed container without being stored in a separator, such a buffering action does not work at all.

Therefore, it is important in the present invention to store the hydrogen generating system in a separator. In addition, the hydrogen generating system is preferred to be such that, when the contained amount of the hydrogen generating agent is 1 (one), including metal having higher ionization tendency than hydrogen, such as metal magnesium, or hydrogenated metal, an insoluble high molecular substance having the metal-ion sequestering ability and the pH adjusting ability, such as hydrogen ion type cation-exchange resin, is contained with a weight ratio of 0.1 or more, preferably 0.5 or more, further preferably 1 or more, and most preferably 5 or more.

Examples 9 and 10, Comparative Example 4, and Reference Example 3

Granular hydrogen ion type cation-exchange resin (grain diameter: about 425 μm to about 1,180 μm) was obtained by stored in a tubular porous container (bottom: circle with diameter of about 14 mm, height: about 58 mm), as shown in FIG. 1. A PET bottle for carbonated drink (about 530 cc volume when filled with full water to the mouth) was substantially filled with about 515 cc of clarified water (charcoal-treated water obtained by treating Fujisawa city tap water to pass through a charcoal column), thereafter the porous container was inserted into the PET bottle mouth while the flange provided around the top of the porous container was engaged with the mouth of the bottle so that the porous container would not sink into the water, and the bottle was closed with a cap. The weight ratio of the metal magnesium and the hydrogen ion type cation-exchange resin included in the obtained hydrogen generating agent was 1:1.

Thereafter, the bottle was left to be laid flat during 15 hours so that the porous container fully contacted with the raw water, and measurements were subsequently done for pH, dissolved-hydrogen concentration, calcium (Ca) hardness and magnesium (Mg) hardness of the contained liquid.

In addition, as Example 10, a mixture with 2,100 mg of the contained amount of hydrogen ion type cation-exchange resin (the weight ratio of metal magnesium and hydrogen ion type cation-exchange resin is 1:7) was produced and treated in the same procedure as Example 9, and measurements were thereafter done for pH, dissolved-hydrogen concentration, calcium (Ca) hardness and magnesium (Mg) hardness of the contained liquid.

Further, as Comparative Example 4, a mixture with 0 mg of the contained amount of hydrogen ion type cation-exchange resin (the weight ratio of metal magnesium and hydrogen ion type cation-exchange resin is 1:0) was produced and treated in the same procedure as Example 9, and measurements were thereafter done for pH, dissolved-hydrogen concentration, calcium (Ca) hardness and magnesium (Mg) hardness of the contained liquid.

In addition, as Reference Example 3, the clarified water was subjected to measurements for pH, dissolved-hydrogen concentration, calcium (Ca) hardness and magnesium (Mg) hardness.

Results are shown in Table 2 below.

TABLE 2

|  | Mg (mg) | SK1BH (mg) | Mg:SK1BH | pH | Ca hardness (ppm) | Mg hardness (ppm) | Total hardness (Ca + Mg) | DH (ppm) |
|---|---|---|---|---|---|---|---|---|
| Reference Example 3 |  |  |  | 7.55 | 36.0 | 19.5 | 55.5 | — |
| Comparative Example 4 | 300 |  |  | 7.75 | 34.5 | 19.5 | 54.0 | 0.27 |
| Example 9 | 300 | 300 | 1:1 | 7.77 | 35.0 | 19.0 | 54.0 | 0.83 |
| Example 10 | 300 | 2100 | 1:7 | 7.50 | 35.5 | 19.0 | 54.5 | 2.10 |

SK1BH = Strongly acidic ion-exchange resin H-type product

As shown in Table 2, by using the instrument for nondestructively producing high-concentration hydrogen solution according to the present invention in which the hydrogen generating system is stored in the separator, high-concentration hydrogen-dissolved liquid can be obtained to have considerably high dissolved-hydrogen concentration while maintaining the pH and the hardness of the raw water.

Examples 11 to 13 and Reference Examples 4 and 5

Alum (burnt alum: Fujisyokuryo CO., LTD.) of 100 mg and metal magnesium powder (MG100: Kanto Metal Corporation) of 100 mg were mixed to be uniformly dispersed, and the obtained mixture as the hydrogen generating system was enclosed in a woven fabric (Precise Regular C5160: Asahi Kasei Corporation) which was then heat sealed before being stored in a tubular porous container (bottom: circle with diameter of about 14 mm, height: about 58 mm), as shown in FIG. 1. A PET bottle for carbonated drink (about 530 cc volume when filled with full water to the mouth) was substantially filled with about 515 cc of clarified water (charcoal-treated water obtained by treating Fujisawa city tap water to pass through a charcoal column), thereafter the porous container was inserted into the PET bottle mouth while the flange provided around the top of the porous container was engaged with the mouth of the bottle so that the porous container would not sink into the water, and the bottle was closed with a cap. The weight ratio of the metal magnesium and the alum included in the obtained hydrogen generating agent was 1:1.

Thereafter, the bottle was left to be laid flat during 10 minutes so that the porous container fully contacted with the raw water, and one of the present inventors (Japanese man of 30's having an average physical size) then held the middle portion of the PET bottle by his dominant hand and moved only the wrist to shake it so that the cap was forming into an arch above the wrist with a pace of 2 strokes per second, total 120 strokes (total 60 seconds).

After that, measurements were done for pH, dissolved-hydrogen concentration, calcium (Ca) hardness and magnesium (Mg) hardness of the contained liquid.

In addition, a plurality of mixtures with various contained amounts of alums (Examples 12 and 13) were produced and treated in the same procedure as Example 11, and measurements were thereafter done for pH, dissolved-hydrogen concentration, calcium (Ca) hardness and magnesium (Mg) hardness of the contained liquid.

Further, as Reference Example 4, the clarified water was subjected to measurements for pH, dissolved-hydrogen concentration, calcium (Ca) hardness and magnesium (Mg) hardness.

In addition, as Reference Example 5, the hydrogen generating system described as Example 11 was directly put into a PET bottle for carbonated drink (about 530 cc volume when filled with full water to the mouth) substantially filled with about 515 cc of clarified water without being separated by nonwoven fabric and porous container, and the bottle was left to be laid flat during 10 minutes, thereafter the contained liquid shaken by the method described for Example 11 was subjected to measurements for pH, dissolved-hydrogen concentration, calcium (Ca) hardness and magnesium (Mg) hardness.

Results are shown in Table 3 below.

TABLE 3

|  | Mg (mg) | Alum (mg) | Mg:Alum | pH | Ca hardness (ppm) | Mg hardness (ppm) | Total hardness (Ca + Mg) | DH (ppm) |
|---|---|---|---|---|---|---|---|---|
| Reference Example 4 |  |  |  | 7.39 | 43.0 | 21.0 | 64.0 | — |
| Reference Example 5 | 100 | 600 | 1:6 | 5.22 | 42.0 | 148.0 | 190.0 | 0.71 |
| Example 11 | 100 | 100 | 1:1 | 9.00 | 42.0 | 43.0 | 85.0 | 0.84 |
| Example 12 | 100 | 600 | 1:6 | 7.47 | 41.0 | 70.0 | 111.0 | 3.00 |
| Example 13 | 100 | 1200 | 1:12 | 7.05 | 37.0 | 54.0 | 91.0 | 3.00 |

Example 14 and Reference Example 6

Granular hydrogen ion type cation-exchange resin was obtained by thermally drying a commercially available weakly acidic ion-exchange resin H-type product (DIAION Ion Exchange Resin WK40L: Mitsubishi Chemical Corporation). The obtained hydrogen ion type cation-exchange resin of 4,000 mg and metal magnesium powder (MG100: Kanto Metal Corporation) of 300 mg were mixed to be uniformly dispersed, and the obtained mixture as the hydrogen generating system was enclosed in a woven fabric (Precise Regular C5160: Asahi Kasei Corporation) which was then heat sealed before being stored in a tubular porous container (bottom: circle with diameter of about 14 mm, height: about 58 mm), as shown in FIG. 1. A PET bottle for carbonated drink (about 530 cc volume when filled with full water to the mouth) was substantially filled with about 515 cc of clarified water (charcoal-treated water obtained by treating Fujisawa city tap water to pass through a charcoal column), thereafter the porous container was inserted into the PET bottle mouth while the flange provided around the top of the porous container was engaged with the mouth of the bottle so that the porous container would not sink into the water, and the bottle was closed with a cap. The weight ratio of the metal magnesium and the hydrogen ion type cation-exchange resin included in the obtained hydrogen generating agent was 1:13.3.

Thereafter, the bottle was left to be laid flat during 10 minutes so that the porous container fully contacted with the raw water, and one of the present inventors (Japanese man of 30's having an average physical size) then held the middle portion of the PET bottle by his dominant hand and moved only the wrist to shake it so that the cap was forming into an arch above the wrist with a pace of 2 strokes per second, total 120 strokes (total 60 seconds).

After that, measurements were done for pH, dissolved-hydrogen concentration, calcium (Ca) hardness and magnesium (Mg) hardness of the contained liquid.

In addition, as Reference Example 6, the clarified water was subjected to measurements for pH, dissolved-hydrogen concentration, calcium (Ca) hardness and magnesium (Mg) hardness.

Results are shown in Table 4 below.

TABLE 4

| | Mg (mg) | WK40L (mg) | Mg: WK40L | pH | Ca hardness (ppm) | Mg hardness (ppm) | Total hardness (Ca + Mg) | DH (ppm) |
|---|---|---|---|---|---|---|---|---|
| Reference Example 6 | | | | 7.10 | 48.0 | 25.0 | 73.0 | — |
| Example 14 | 300 | 4000 | 1:13 | 7.16 | 49.0 | 26.0 | 75.0 | 1.10 |

WK40L = Weakly acidic ion-exchange resin H-type product

Note that the condition of maintaining or not changing the previously-described "by-products such as cations dissolved from the hydrogen generating agent during the hydrogen generation" in the raw water is represented, such as, but not limited to, by the following cases.

That is, such cases include cases where the relevant cations in the high-concentration hydrogen solution (e.g. total irons when the instrument according to the present invention uses iron as the hydrogen generating agent) are within a range of (the relevant cations in the raw water (mg/L) minus 4.5 mg/L) to (the relevant cations in the raw water (mg/L) plus 4.5 mg/L), preferably (the relevant cations in the raw water (mg/L) minus 3 mg/L) to (the relevant cations in the raw water (mg/L) plus 3 mg/L), further preferably (the relevant cations in the raw water (mg/L) minus 2 mg/L) to (the relevant cations in the raw water (mg/L) plus 2 mg/L), still further preferably (the relevant cations in the raw water (mg/L) minus 1 mg/L) to (the relevant cations in the raw water (mg/L) plus 1 mg/L), and most preferably (the relevant cations in the raw water (mg/L) minus 0.5 mg/L) to (the relevant cations in the raw water (mg/L) plus 0.5 mg/L).

Examples 15 to 19, Comparative Example 5, and Reference Example 7

Granular hydrogen ion type cation-exchange resin (grain diameter: about 425 μm to about 1,180 μm) was obtained by thermally drying a commercially available strongly acidic ion-exchange resin H-type product (DIAION Ion Exchange Resin SK1BH: Mitsubishi Chemical Corporation). The obtained hydrogen ion type cation-exchange resin of 1,200 mg and metal iron grains (reduced iron, Wako Pure Chemical Industries, Ltd., here and hereinafter) of 600 mg were mixed to be uniformly dispersed, and the obtained mixture as the hydrogen generating system was enclosed in a woven fabric (Tyvek 1073B: DuPont-Asahi Flash Spun Products Co., Ltd.) which was then heat sealed before being stored in a tubular porous container (bottom: circle with diameter of about 14 mm, height: about 58 mm), as shown in FIG. 1. A PET bottle for carbonated drink (about 530 cc volume when filled with full water to the mouth) was substantially filled with about 515 cc of clarified water (charcoal-treated water obtained by treating Fujisawa city tap water to pass through a charcoal column), thereafter the porous container was inserted into the PET bottle mouth while the flange provided around the top of the porous container was engaged with the mouth of the bottle so that the porous container would not sink into the water, and the bottle was closed with a cap. The weight ratio of the iron and the hydrogen ion type cation-exchange resin included in the obtained hydrogen generating agent was 1:2.

Thereafter, the bottle was left to be laid flat during 8 hours so that the porous container fully contacted with the raw water, and one of the present inventors (Japanese man of 30's having an average physical size) then held the middle portion of the PET bottle by his dominant hand and moved only the wrist to shake it so that the cap was forming into an arch above the wrist with a pace of 2 strokes per second, total 120 strokes (total 60 seconds).

After that, the contained liquid was subjected to measurements for pH, dissolved-hydrogen concentration and total iron, and taste and smell were confirmed.

Total iron was measured by the FerroVer method using a water quality analyzer DR/4000 (manufactured by HACH Company) (here and hereinafter).

In addition, a plurality of mixtures with various contained amounts of irons (Examples 16 to 19) were produced and treated in the same procedure as Example 15, and the contained liquid was thereafter subjected to measurements for pH, dissolved-hydrogen concentration and total iron, and taste and smell were confirmed.

Further, as Comparative Example 5, a mixture contained therein with malic acid (DL-malic acid: FUSO CHEMICAL CO., LTD.) substitute for the hydrogen ion type cation-exchange resin was produced and treated in the same procedure as Example 15, and the contained liquid was thereafter subjected to measurements for pH, dissolved-hydrogen concentration and total iron.

In addition, as Reference Example 7, Fujisawa city tap water was subjected to measurements for pH and total iron.

Results are shown in Table 5 below.

TABLE 5

| | Fe (mg) | SK1BH or Malic acid (mg) | Fe:SK1BH | pH | Total iron (mg/L) | DH (ppm) | Flavor | Smell |
|---|---|---|---|---|---|---|---|---|
| Reference Example 7 | | | | 7.05 | Below detection limit | — | — | — |
| Comparative Example 5 | 100 | 1200 | 1:12 | 3.22 | 4.920 | 1.13 | Acerbic | Iron smell |
| Example 15 | 600 | 1200 | 1:2 | 6.85 | 0.486 | 2.60 | Little acerbic | Little iron smell |
| Example 16 | 300 | 1200 | 1:4 | 6.99 | 0.372 | 2.20 | Little acerbic | Little iron smell |

TABLE 5-continued

| | Fe (mg) | SK1BH or Malic acid (mg) | Fe:SK1BH | pH | Total iron (mg/L) | DH (ppm) | Flavor | Smell |
|---|---|---|---|---|---|---|---|---|
| Example 17 | 200 | 1200 | 1:6 | 7.06 | 0.142 | 1.85 | None | None |
| Example 18 | 100 | 1200 | 1:12 | 7.01 | 0.149 | 1.51 | None | None |
| Example 19 | 50 | 1200 | 1:24 | 7.06 | 0.155 | 0.68 | None | None |

SK1BH = Strongly acidic ion-exchange resin H-type product

Examples 20 and 21, Comparative Example 6, and Reference Example 8

Granular hydrogen ion type cation-exchange resin (grain diameter: about 425 μm to about 1,180 μm) was obtained by thermally drying a commercially available strongly acidic ion-exchange resin H-type product (DIAION Ion Exchange Resin SK1BH: Mitsubishi Chemical Corporation). The obtained hydrogen ion type cation-exchange resin of 2,000 mg and metal aluminum grains (#260S, MINALCO LTD., here and hereinafter) of 2,000 mg were mixed to be uniformly dispersed, and the obtained mixture as the hydrogen generating system was enclosed, as shown in FIG. 1, in a woven fabric (Tyvek 1433C: DuPont-Asahi Flash Spun Products Co., Ltd.) which was then heat sealed, thus the hydrogen generating system was obtained. A PET bottle for carbonated drink (about 530 cc volume when filled with full water to the mouth) was filled with Fujisawa city tap water, thereafter the hydrogen generating system was put into the PET bottle, and the bottle was closed with a cap. The weight ratio of the metal aluminum grains and the hydrogen ion type cation-exchange resin included in the obtained hydrogen generating agent was 1:1.

Thereafter, the bottle was left to be laid flat during 15 hours so that the porous container fully contacted with the raw water, and one of the present inventors (Japanese man of 30's having an average physical size) then held the middle portion of the PET bottle by his dominant hand and moved only the wrist to shake it so that the cap was forming into an arch above the wrist with a pace of 2 strokes per second, total 120 strokes (total 60 seconds).

After that, measurements were done for pH, dissolved-hydrogen concentration and aluminum (Al) concentration of the contained liquid.

The Al concentration was measured by the aluminum method using a water quality analyzer DR/4000 (manufactured by HACH Company) (here and hereinafter).

In addition, as Example 21, a mixture contained therein with calcined zeolite (natural zeolite specially calcined powder, manufacturer: Wed Co., Ltd., here and hereinafter) substitute for the hydrogen ion type cation-exchange resin was produced and treated in the same procedure as Example 20, and the contained liquid was thereafter subjected to measurements for pH, dissolved-hydrogen concentration and Al concentration. Note that the pH and the Al concentration would not be accurately measured in this example because the nonwoven fabric was broken during the experiment and the contents leaked out into the raw water, but the example could intrinsically fall within embodiments of the present application.

Further, as Comparative Example 6, a mixture contained therein with malic acid (DL-malic acid: FUSO CHEMICAL CO., LTD.) substitute for the hydrogen ion type cation-exchange resin was produced and treated in the same procedure as Example 20, and measurements were thereafter done for pH, dissolved-hydrogen concentration and Al concentration of the contained liquid.

In addition, as Reference Example 8, Fujisawa city tap water was subjected to measurements for pH and Al concentration.

Results are shown in Table 6 below.

TABLE 6

| | Al (mg) | SK1BH, Calcined zeolite or Malic acid (mg) | Al:SK1BH | pH | Al concentration (mg/L) | DH (ppm) |
|---|---|---|---|---|---|---|
| Reference Example 8 | | | | 7.02 | 0.025 | — |
| Comparative Example 6 | 2000 | 2000 | 1:1 | 2.68 | 0.220 | 0.02 |
| Example 20 | 2000 | 2000 | 1:1 | 7.06 | 0.034 | 3.10 |
| Example 21 | 2000 | 2000 | 1:1 | 8.56 | 0.8以上 | 7.50 |

SK1BH = Strongly acidic ion-exchange resin H-type product

Examples 22 and 23, Comparative Examples 7 and 8, and Reference Example 9

Granular hydrogen ion type cation-exchange resin (grain diameter: about 425 μm to about 1,180 μm) was obtained by thermally drying a commercially available strongly acidic ion-exchange resin H-type product (DIAION Ion Exchange Resin SK1BH: Mitsubishi Chemical Corporation). The obtained hydrogen ion type cation-exchange resin of 2,000 mg and metal nickel grains (grain diameter: 150 μm or less, Wako Pure Chemical Industries, Ltd.) of 2,000 mg were mixed to be uniformly dispersed, and the obtained mixture as the hydrogen generating system was enclosed, as shown in FIG. 1, in a woven fabric (Tyvek 1433C: DuPont-Asahi Flash Spun Products Co., Ltd.) which was then heat sealed, thus the hydrogen generating system was obtained. A PET bottle for carbonated drink (about 530 cc volume when filled with full water to the mouth) was filled with Fujisawa city tap water, thereafter the hydrogen generating system was put into the PET bottle, and the bottle was closed with a cap. The weight ratio of the metal nickel grains and the hydrogen ion type cation-exchange resin included in the obtained hydrogen generating agent was 1:1.

Thereafter, the bottle was left to be laid flat during 15 hours so that the porous container fully contacted with the raw water, and one of the present inventors (Japanese man of 30's having an average physical size) then held the middle portion of the PET bottle by his dominant hand and moved only the wrist to shake it so that the cap was forming into an arch above the wrist with a pace of 2 strokes per second, total 120 strokes (total 60 seconds).

After that, measurements were done for pH, dissolved-hydrogen concentration and nickel (Ni) concentration of the contained liquid.

The Ni concentration was measured by IPC emission spectrometry at Japan Food Research Laboratories.

In addition, as Example 23, a mixture contained therein with metal cobalt grains (grain diameter: 180 μm or less/90% or more, Wako Pure Chemical Industries, Ltd.) substitute for the metal nickel grains was produced and treated in the same procedure as Example 20, and the contained liquid was thereafter subjected to measurements for pH, dissolved-hydrogen concentration and cobalt (Co) concentration, and the color of the solution was observed.

The Co concentration was measured by IPC emission spectrometry at Japan Food Research Laboratories.

Further, as Comparative Examples 7 and 8, mixtures contained therein with malic acid (DL-malic acid: FUSO CHEMICAL CO., LTD.) substitute for the hydrogen ion type cation-exchange resins were produced and treated in the same procedure as Examples 22 and 23, and each contained liquid was thereafter subjected to measurements for pH and dissolved-hydrogen concentration, and the color of each solution was observed.

In addition, as Reference Example 9, Fujisawa city tap water was subjected to measurements for pH, Ni concentration and Co concentration, and the color thereof was observed.

Results are shown in Table 7 below.

TABLE 7

| | Ni or Co (mg) | SK1BH or Malic acid (mg) | Ni or Co: SK1BH or Malic acid | pH | Ni or Co Concentration (mg/L) | DH (ppm) | Color |
|---|---|---|---|---|---|---|---|
| Reference Example 9 | | | | 7.37 | 0.01 or less | — | Clear |
| Comparative Example 7 | 2000 | 2000 | 1:1 | 2.74 | — | 0.96 | Light green |
| Comparative Example 8 | 2000 | 2000 | 1:1 | 2.75 | — | 3.60 | Peach |
| Example 22 | 2000 | 2000 | 1:1 | 7.16 | 0.09 | 2.40 | Clear |
| Example 23 | 2000 | 2000 | 1:1 | 7.24 | 0.17 | 3.90 | Clear |

SK1BH = Strongly acidic ion-exchange resin H-type product

Example 24 and Reference Example 10

Calcined zeolite of 500 mg and metal aluminum grains of 500 mg were mixed to be uniformly dispersed, and the obtained mixture as the hydrogen generating system was enclosed, as shown in FIG. 1, in a woven fabric (Tyvek 1433C: DuPont-Asahi Flash Spun Products Co., Ltd.) which was then heat sealed, thus the hydrogen generating system was obtained. A PET bottle for carbonated drink (about 530 cc volume when filled with full water to the mouth) was filled with Fujisawa city tap water, thereafter the hydrogen generating system was put into the PET bottle, and the bottle was closed with a cap. The weight ratio of the metal aluminum grains and the calcined zeolite included in the obtained hydrogen generating agent was 1:1.

Thereafter, the bottle was left to be laid flat during 15 hours so that the porous container fully contacted with the raw water, and one of the present inventors (Japanese man of 30's having an average physical size) then held the middle portion of the PET bottle by his dominant hand and moved only the wrist to shake it so that the cap was forming into an arch above the wrist with a pace of 2 strokes per second, total 120 strokes (total 60 seconds).

After that, measurements were done for pH, dissolved-hydrogen concentration and Al concentration of the contained liquid.

In addition, as Reference Example 10, Fujisawa city tap water was subjected to measurements for pH and Al concentration.

Results are shown in Table 8 below.

TABLE 8

| | Al (mg) | Calcined zeolite (mg) | Al:Calcined zeolite | pH | Al Concentration (mg/L) | DH (ppm) |
|---|---|---|---|---|---|---|
| Reference Example 10 | | | | 7.02 | 0.027 | — |
| Example 24 | 500 | 500 | 1:1 | 7.05 | 0.031 | 5.70 |

Examples 25 and 26, Comparative Examples 9 and 10, and Reference Example 11

Potassium alum (aluminum potassium sulfate anhydrous (burnt alum), Wako Pure Chemical Industries, Ltd., here and hereinafter) of 500 mg and metal iron grains of 200 mg were mixed to be uniformly dispersed, and the obtained mixture as the hydrogen generating system was enclosed, as shown in FIG. 1, in a woven fabric (Tyvek 1433C: DuPont-Asahi Flash Spun Products Co., Ltd.) which was then heat sealed, thus the hydrogen generating system was obtained. A PET bottle for carbonated drink (about 530 cc volume when filled with full water to the mouth) was filled with Fujisawa city tap water, thereafter the hydrogen generating system was put into the PET bottle, and the bottle was closed with a cap. The weight ratio of the metal iron grains and the potassium alum included in the obtained hydrogen generating agent was 1:2.5.

Thereafter, the bottle was left to be laid flat during one hour so that the porous container fully contacted with the raw water, and one of the present inventors (Japanese man of 30's having an average physical size) then held the middle portion of the PET bottle by his dominant hand and moved only the wrist to shake it so that the cap was forming into an arch above the wrist with a pace of 2 strokes per second, total 120 strokes (total 60 seconds).

After that, measurements were done for pH and dissolved-hydrogen concentration of the contained liquid.

In addition, as Example 26, a mixture was produced in which metal zinc grains (zinc powder, Wako Pure Chemical Industries, Ltd.) of 2,000 mg were contained substitute for metal iron grains of 200 mg and hydrogen ion type cation-exchange resin (the above-described granular hydrogen ion type cation-exchange resin obtained by thermally drying a commercially available strongly acidic ion-exchange resin H-type product (DIAION Ion Exchange Resin SK1BH: Mitsubishi Chemical Corporation)) of 2,000 mg was also contained substitute for potassium alum of 500 mg, and the mixture was treated in the same procedure as Example 25, thereafter the contained liquid was subjected to measurements for pH and dissolved-hydrogen concentration.

Further, as Comparative Examples 9 and 10, mixtures contained therein with malic acid (DL-malic acid: FUSO CHEMICAL CO., LTD.) of 500 mg or 2,000 mg substitute for the potassium alum or the hydrogen ion type cation-exchange resin were produced and treated in the same procedure as Examples 25 and 26, and each contained liquid was thereafter subjected to measurements for pH and dissolved-hydrogen concentration.

In addition, as Reference Example 11, Fujisawa city tap water was subjected to measurement for pH.

Results are shown in Table 9 below.

[Table 9]

TABLE 9

| | Fe or Zn (mg) | Potassium alum, SK1BH or Malic acid (mg) | Fe or Zn:Potassium alum, SK1BH or Malic acid | pH | DH (ppm) |
|---|---|---|---|---|---|
| Reference Example 11 | | | | 7.02 | — |
| Comparative Example 9 | 200 | 500 | 1:2.5 | 3.01 | 0.24 |
| Comparative Example 10 | 2000 | 2000 | 1:1 | 2.90 | 6.60 |
| Example 25 | 200 | 500 | 1:2.5 | 7.02 | 0.65 |
| Example 26 | 2000 | 2000 | 1:1 | 6.82 | 3.90 |

SK1BH = Strongly acidic ion-exchange resin H-type product

Example 27 and Reference Example 12

Magnesium hydroxide (manufactured by Wako Pure Chemical Industries, Ltd.) of 1,000 mg and metal aluminum grains of 1,000 mg were mixed to be uniformly dispersed, and the obtained mixture as the hydrogen generating system was enclosed, as shown in FIG. 1, in a woven fabric (Tyvek 1433C: DuPont-Asahi Flash Spun Products Co., Ltd.) which was then heat sealed, thus the hydrogen generating system was obtained. A PET bottle for carbonated drink (about 530 cc volume when filled with full water to the mouth) was filled with Fujisawa city tap water, thereafter the hydrogen generating system was put into the PET bottle, and the bottle was closed with a cap. The weight ratio of the metal aluminum grains and the magnesium hydroxide included in the obtained hydrogen generating agent was 1:1.

Thereafter, the bottle was left to be laid flat during 15 hours so that the porous container fully contacted with the raw water, and one of the present inventors (Japanese man of 30's having an average physical size) then held the middle portion of the PET bottle by his dominant hand and moved only the wrist to shake it so that the cap was forming into an arch above the wrist with a pace of 2 strokes per second, total 120 strokes (total 60 seconds).

After that, measurements were done for pH, dissolved-hydrogen concentration and Al concentration of the contained liquid.

In addition, as Reference Example 12, Fujisawa city tap water was subjected to measurements for pH and Al concentration.

Results are shown in Table 10 below.

TABLE 10

| | Al (mg) | Mg(OH)2 (mg) | Al: Mg(OH)2 | pH | Al Concentration (mg/L) | DH (ppm) |
|---|---|---|---|---|---|---|
| Reference Example 12 | | | | 7.02 | 0.027 | — |
| Example 27 | 1000 | 1000 | 1:1 | 7.13 | 0.073 | 2.40 |

What is claimed is:

1. An instrument for nondestructively producing high-concentration hydrogen solution, the instrument comprising a hydrogen generating system stored in a separator, the hydrogen generating system containing:

at least either one of metal magnesium or iron as a hydrogen generating agent that reacts with raw water to generate hydrogen; and hydrogen ion type cation-exchange resin that has a metal ion sequestering ability that sequesters metal ions dissolved from the hydrogen generating agent and a pH adjusting ability that inhibits or remove hydroxide ions, the at least either one of metal magnesium or iron and the hydrogen ion type cation-exchange resin being in contact with each other.

2. An instrument for nondestructively producing high-concentration hydrogen solution, the instrument comprising a hydrogen generating system stored in a separator, the hydrogen generating system containing:

either one or more of aluminum, zinc, nickel or cobalt as a hydrogen generating agent that generates hydrogen by contact with raw water and makes hydrogen solution; and one agent that has a metal ion sequestering ability and a pH adjusting ability, the either one or more of aluminum, zinc, nickel or cobalt and the one agent being in contact with each other, wherein the one agent that has a metal ion sequestering ability and a pH adjusting ability includes at least either one of a substance that releases hydrogen ions while adsorbing metal ions or a compound that is hydrolyzed to generate metal hydroxide, and the substance that releases hydrogen ions while adsorbing metal ions or the compound that is hydrolyzed to generate metal hydroxide includes at least either one of hydrogen ion type cation-exchange resin, alum, or magnesium hydroxide.

* * * * *